(12) United States Patent
Fujisawa et al.

(10) Patent No.: US 7,171,154 B2
(45) Date of Patent: Jan. 30, 2007

(54) METHOD OF COMMUNICATION BY E-MAIL

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 477 days.

(21) Appl. No.: 10/468,209

(22) PCT Filed: Mar. 5, 2002

(86) PCT No.: PCT/JP02/02021

§ 371 (c)(1),
(2), (4) Date: Aug. 18, 2003

(87) PCT Pub. No.: WO02/073423

PCT Pub. Date: Sep. 19, 2002

(65) Prior Publication Data

US 2004/0126747 A1 Jul. 1, 2004

(30) Foreign Application Priority Data

Mar. 9, 2001 (JP) .............................. 2001-066033

(51) Int. Cl.
*G09B 5/00* (2006.01)

(52) U.S. Cl. ...................... 434/307 R; 434/365; 463/42

(58) Field of Classification Search ................ 434/185, 434/307 R, 308, 365, 369, 393; 463/1, 30–42; 446/175, 268, 397; 704/270; 709/206, 217; 725/153

See application file for complete search history.

(56) References Cited

U.S. PATENT DOCUMENTS

| 5,330,380 | A | * | 7/1994 | McDarren et al. | 446/397 |
| 5,733,131 | A | * | 3/1998 | Park | 434/307 R |
| 5,746,602 | A |   | 5/1998 | Kikinis |  |
| 5,853,327 | A | * | 12/1998 | Gilboa | 463/39 |
| 6,352,478 | B1 | * | 3/2002 | Gabai et al. | 463/42 |
| 6,494,762 | B1 | * | 12/2002 | Bushmitch et al. | 446/268 |
| 6,551,165 | B2 | * | 4/2003 | Smirnov | 446/175 |
| 6,629,133 | B1 | * | 9/2003 | Philyaw et al. | 709/217 |
| 6,631,351 | B1 | * | 10/2003 | Ramachandran et al. | 704/270 |
| 6,742,188 | B1 | * | 5/2004 | Del Castillo | 725/153 |
| 6,773,344 | B1 | * | 8/2004 | Gabai et al. | 463/1 |
| 6,775,689 | B1 | * | 8/2004 | Raghunandan | 709/206 |

FOREIGN PATENT DOCUMENTS

| JP | 6-274402 |   | 9/1994 |
| JP | 06-274402 | A1 * | 9/1994 |
| JP | 2001-24689 |   | 1/2001 |

* cited by examiner

*Primary Examiner*—Joe H. Cheng
(74) *Attorney, Agent, or Firm*—Manabu Kanesaka

(57) ABSTRACT

The present invention provides an electronic mail communication method via a stuffed toy. At a mail center, a mail address for an owner of a stuffed toy is acquired together with ID code assigned to the stuffed toy, and data related to the ID code is transmitted as an electronic mail to the owner. The electronic mail is based on a conversational text including characters, signs, graphics, voices, or sounds, and the owner can enjoy communications with the stuffed toy by overlapping the images provided through the communications with an image of the stuffed toy at the owner's hand.

7 Claims, 4 Drawing Sheets

METHOD OF COMMUNICATION BY E-MAIL

TEHCNICAL FIELD

The present invention relates to a communication method with electronic mails via anthropomorphized objects like stuffed ones.

BACKGROUND TECHNOLOGY

Stuffed toys play, different from other toys, the specific role of anthropomorphism, and the existence is unconsciously recognized as something specific. Manufactures of the stuffed toys also are aware of this fact, and have made specific efforts in development of the stuffed toys. For instance, there are several manufactures of the "teddy bears" generally regarded as the oldest but most successful stuffed toy, and for instance the "Teddy Baby", which was produced by Steiff GmbH and is the most popular one among the teddy bear products, has specific features of anthropomorphism especially in the bear's face portion. The Walt Disney Corp. also succeeded in development of anthropomorphized animal toys.

Now there are various types of stuffed animal toys on the market including those opening and closing the eyes, those capable of freely moving the joints, drinking milk and peeing, and even those electronically controlled and capable of walking. In addition, the stuffed toys almost similar to robots as those disclosed in Japanese Patent Laid-Open Publication No. HEI 11-505054 and other ones having specific and interesting features are being introduced into the market one after another, and all manufactures of the stuffed toys as described above have been competing in the degree of anthropomorphism.

As the efforts to heighten the degree of anthropomorphism in stuffed toys require increase in development and production cost, both manufactures and consumers are rather negative in pursuit for excessive anthropomorphism.

DISCLOSURE OF THE INVENTION

An object of the present invention is to provide a communication method capable of satisfying requirements of owners of anthropomorphized objects such as stuffed toy for a higher degree of anthropomorphism by making use of the Internet and its terminals as computers, mobile telephones or the like. A degree of anthropomorphism realized by the present invention is not a lower one such as that at which, for instance, a stuffed toy laughs in response to applause, but is a higher one at which the anthropomorphized objects expresses their "intentions and hopes".

The communication method according to the present invention is characterized in that, after ID code assigned to an anthropomorphized object and a mail address of an owner of the anthropomorphized object are acquired, data related to the ID code is transmitted to the owner by means of an electronic mail.

The data related to the ID code is preferably a conversational text including characters, signs, graphics, voices or sounds. In the communication method, it is preferable to acquire personal attribute information for said owner together with the mail address. In this communication method, it is preferable to transmit the mail with the personal attribute information added thereto. Further in the communication method described above, preferably news and/or advertisement information is preferably inserted in the conversational text. In addition, in the communication method, the news and/or advertisement information should preferably be transmitted together with the conversational text as an e-mail.

BEST MODE FOR CARRYING OUT THE INVENTION

Preferable embodiments of the present invention are described below with reference to the drawings.

Figure 1:
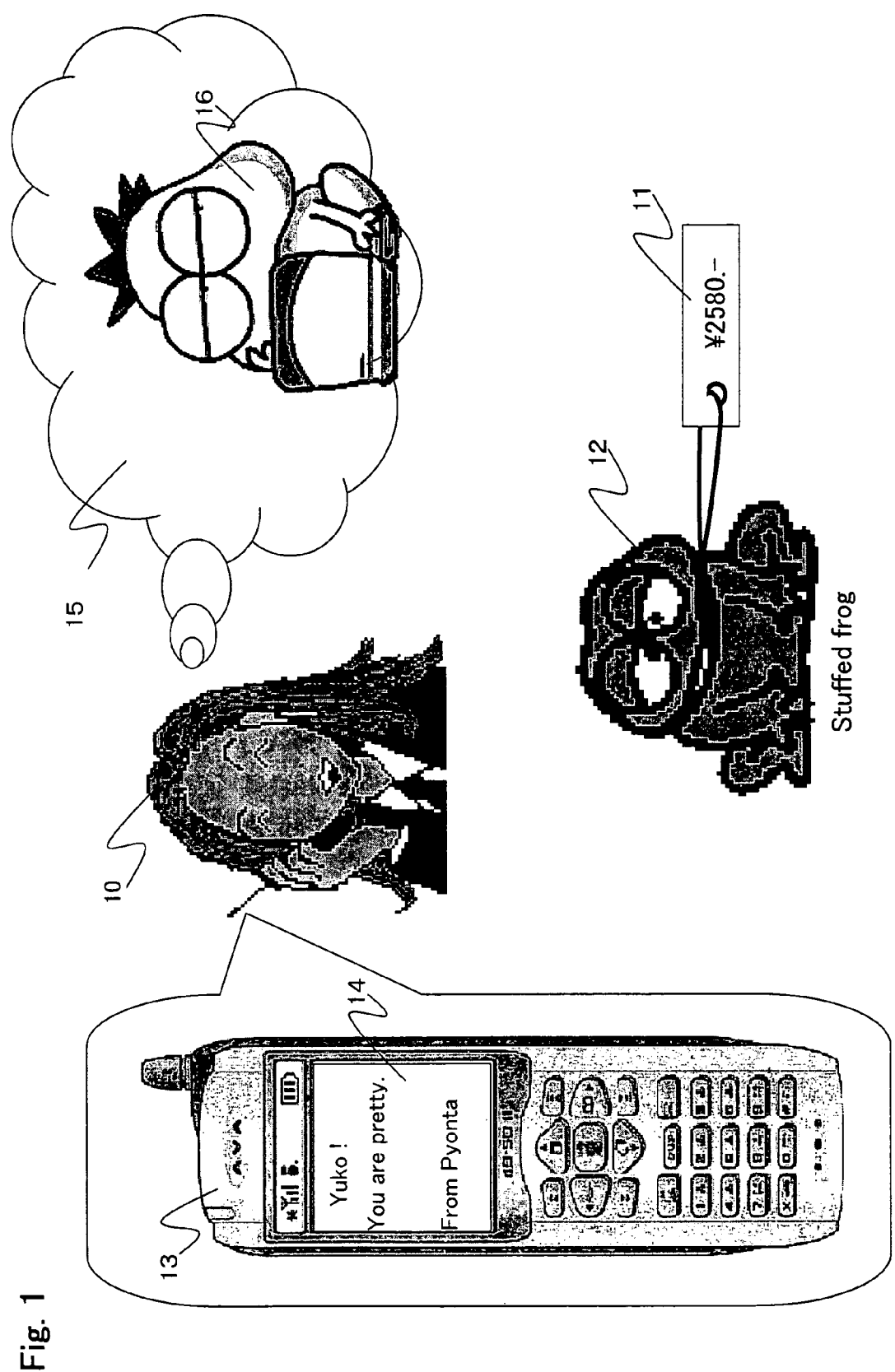
FIG. 1 is an image view showing a specific example of a communication method according to the present invention using a stuffed toy and a mobile telephone.

FIG. 1 is an image view showing a specific example of the communication method according to the present invention using a stuffed toy and a mobile telephone, and a user 10 utilizing the communication service is shown in the center of FIG. 1, and then a frog-like stuffed animal 12 with a price tag 11 is shown at a lower section of FIG. 1. On a display screen 14 of a mobile telephone 13 held by the user 10 with the right hand, an electronic mail text sent from a mail center providing the communication service is displayed.

A FIG. 16 illustrated in a spout 15 is an image imagined by the user 10 from the stuffed animal 12 as well as from the received electronic mail text.

The stuffed animal 12 may be one purchased from a shop like a toy shop, one used in a game machine such as UFO catcher, or one provided as novelty goods for sales promotion.

The user 10 having acquired the stuffed animal 12 can receive the electronic mail by making the registering operation as described hereinafter to the mail center to have the feeling like having received the electronic mail from the stuffed animal 12. As a result, the user 10 may overlap the electronic mail text displayed on the mobile telephone on the image of the stuffed animal 12 at his or her hand and make a conversation with the stuffed animal 12 saying "Thank you" or something like that.

The anthropomorphized objects according to the present invention include, in addition to the stuffed animal 12, dolls, toys, pets, cars, garden plants, and everything that does not make other people feel strangeness when the user 10 makes a conversation with it.

In the present invention, the electronic mail text should preferably include characters, signs, graphics, voices, and sounds to enable a virtual conversation between the user 10 and the anthropomorphized object.

Figure 2:
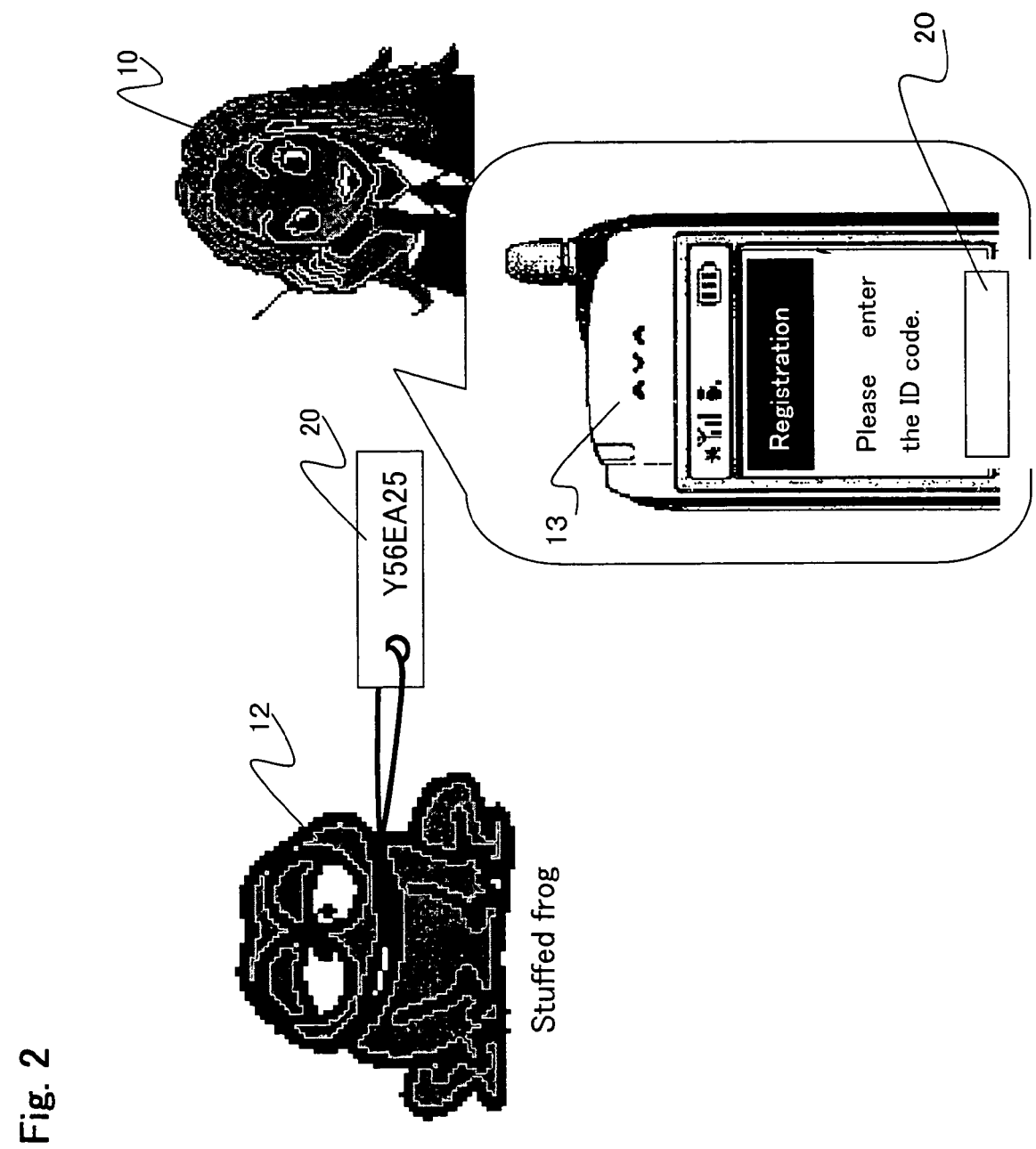
FIG. 2 is an explanatory view illustrating a work for registering ID code.

FIG. 2 is an explanatory view illustrating the operation for registration as described above. ID code 20 is assigned to the stuffed animal 12, and in this embodiment, the ID code 20 specific to the stuffed animal 12 is printed on a rear surface of the price tag 11 described above.

An owner of the stuffed animal 12 hoping to utilize the communication service accesses the mail center providing the services through a mobile telephone 13 (such as a mobile terminal, a personal computer, and others enabling access to a network service such as the Internet), and input this ID code 20.

In the mail center, it is possible to acknowledge the ID code 20 and an electronic mail address of the user 10, and also to send the information previously related to the ID code 20 as an electronic mail to the user 10 (the owner of the stuffed animal 12).

Figure 3:
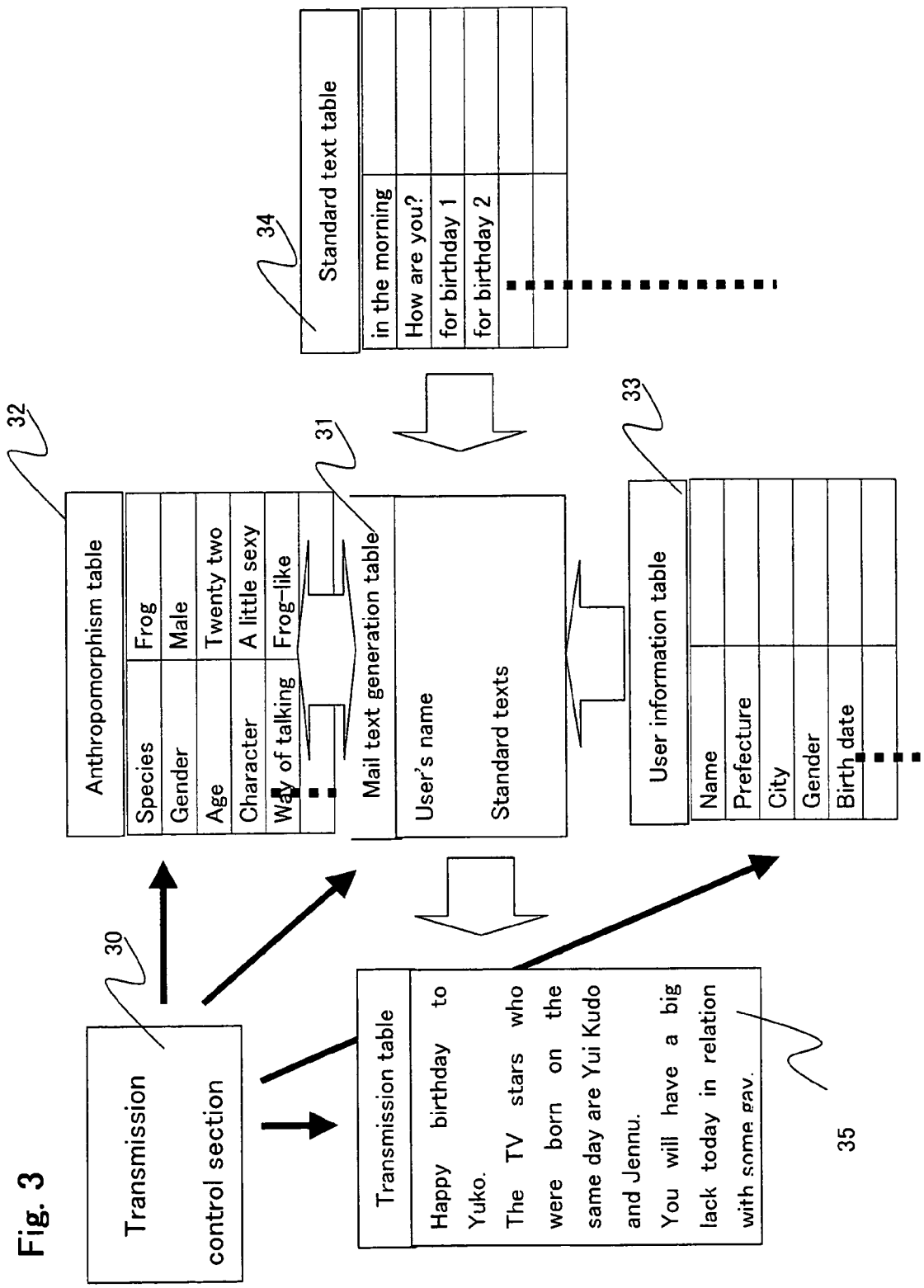
FIG. 3 is an explanatory view illustrating generation of a mail text to be transmitted in a mail center.

A method of generating an electronic mail text at the mail center is described below with reference to FIG. 3. The mail text is generated at a transmission control section 30 of the mail center, and FIG. 3 shows a mail text generation table 31 used for generating a mail text, an anthropomorphizing table 32 which is referred during generation of a mail text, a user information table 33, a standard text table 34, and a transmission table 35 in which the generated mail text is temporally stored.

The transmission control section 30 makes the mail text generation table 31 generate a preset mail text by referring the three tables of the anthropomorphizing table 32, the user information table 33, and the standard text table 34 and also by comparing the conditions, and transmits the generated mail text to the user 10 from the transmission table 35.

The anthropomorphizing table 32 includes attribute information indicating the stuffed animal 12 as an anthropomorphized object such as the gender, age, personality, and the like. The user information table 33 includes the attribute information for the user 10, and the information is recorded in the mail center when the user 10 makes a first registration or enters data subsequently at the mail center. The standard text table 34 includes various types of texts such as those for greeting, or those expressing feeling such as delight, anger, sorrow, and pleasure.

The mail text generation table 31 receives an instruction for generation of a mail text together with the conditions relating to the user to which the mail is to be sent, ID code for the user's stuffed animal, a time for transmission, contents to be transmitted or the like from the transmission control section 30, selects an optimal text from the standard text table 34 according to the instructed conditions and also by referring to the anthropomorphizing table 32 and the user information table 33 corresponding to the instructed conditions respectively, and generates a text based on the grammatical rules stored in the mail table generation table 31. The said contents to be transmitted indicate, for instance, a type of a text for greeting or expressing feelings such as delight, anger, sorrow, and pleasure, or contents of the mail text sent with or without a message for delivering news or an advertisement.

When selecting any one of the standard texts previously prepared, the selection may be performed by preparing the standard text table 34 for each of the anthropomorphizing tables 32 and selecting any of the standard tables 34 according to the instructed conditions from the transmission control section 30, or by preparing the reference standard text table 34 and making selection based on the standard text selecting/converting system making use of the artificial intelligence (AI) by referring to the instructed conditions as well as to the data in the anthropomorphizing table 32. All of the terms and conditions are selected in the mail center.

The transmission control section 30 instructs the mail text generation table 31 to synthesize the standard text selected or converted as described above with a name and other information relating to the user extracted from the user information table 33 identified according to the instructed conditions, and then the transmission control section 30 sends the synthesized text as a mail text from the transmission table 35 to a mail address for the user 10.

Compilation and transmission of a mail text in and from the transmission control section 30 were described above, and actions of a schedule generating section 40 for controlling a time for transmission of a prepared mail text inside the transmission control section 30 are described below with reference to FIG. 4. In the schedule generating section 40, daily, weekly, and monthly transmission schedules 41 are prepared for each user.

Figure 4:
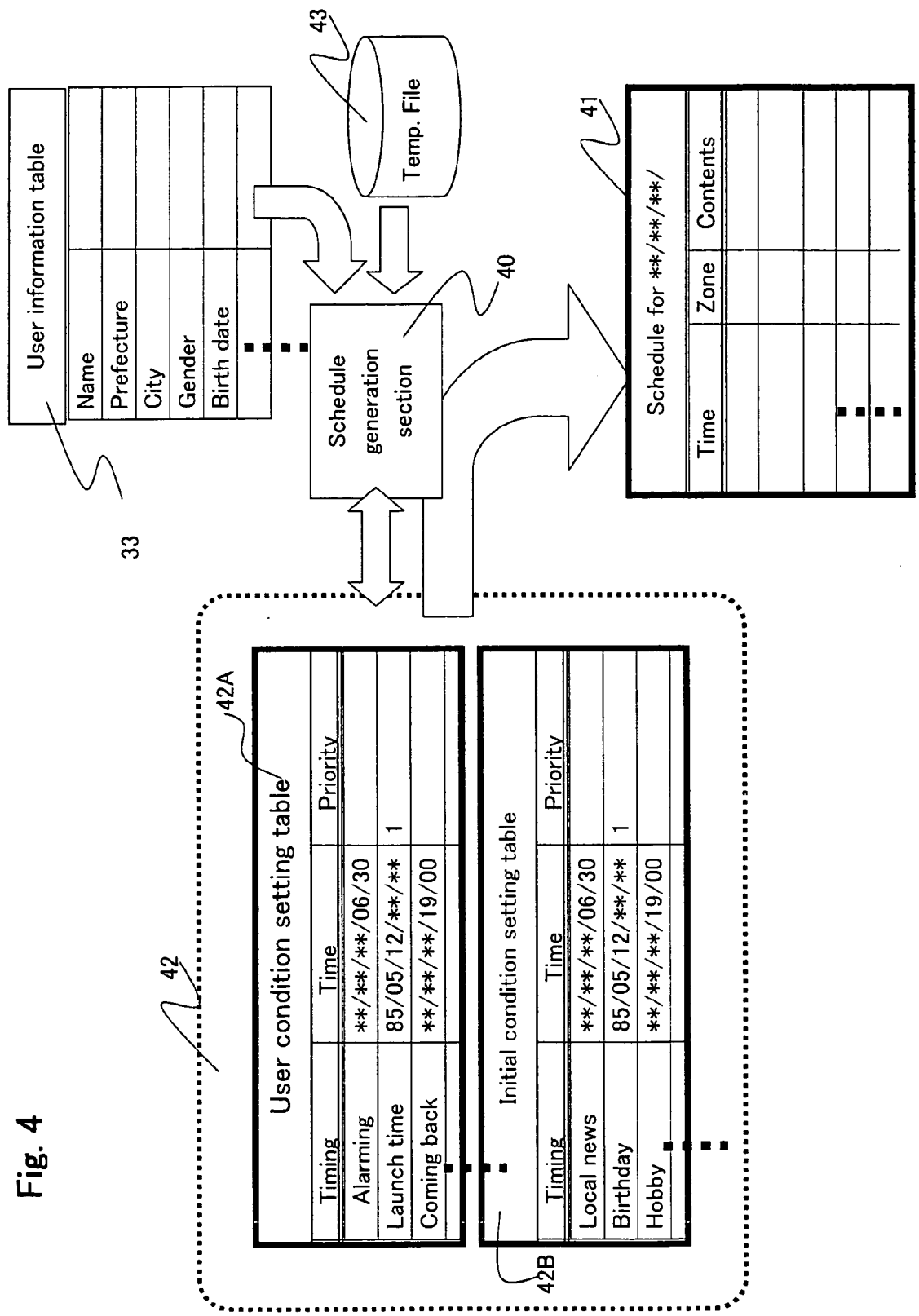
FIG. 4 is an explanatory view illustrating a method of managing a transmission time for the mail text.

FIG. 4 shows a condition setting table 42 (a range surrounded by a dotted line) used for generating the transmission schedule 41 together with the user information table 33 (described in relation to FIG. 3). The condition setting table 42 consists of a user condition setting table 42A in which given information is set for each user, and an initial condition setting table 42B commonly set for all users, and conditions for each item obtained by analysis of personal attribute information stored in the user information table 33 is stored in the condition setting table 42.

FIG. 4 also shows a temporary information file 43 for storing therein the conditions set in the condition setting table 42 such as attribute information common to users, and news or advertisements to be selected and distributed to each discrete user in response to the user's attribute information concerning the user's tastes, hobbies, or the like.

The schedule generating section 40 generates daily, weekly, or monthly transmission schedules 41 for each user 10 based on the user's data stored in the condition setting table 42. Namely, the schedule generating section 40 synthesizes the conditions stored in the condition setting table 42A for the user with the schedule information stored in the initial condition setting table 42B. Further the configuration is allowable in which times of transmission per day is previously set for the user 10 in the transmission control section 30 to control times of transmission per day, and when it is anticipated that the times of transmission will increase, a priority column may be provided in the condition setting table 42 to transmit mails according to the priority order or control the times of transmission.

In response to the schedule data prepared as described above, the schedule generating section 40 collects contents corresponding to each item respectively from the user information table 33 or the temporary information file 43 to complete the transmission schedule 41.

With the present invention, a high degree of anthropomorphism is possible even with a very cheap stuffed toy or animal with the price of, for instance, 100 yen sold on the market. As a result, everybody can acquire a toy or the like anthropomorphized at a high degree.

With the present invention, anthropomorphized objects such as stuffed toys can be sold as gifts, and further ID code assigned to the stuffed toy can be given to the presenter, so that the anthropomorphized objects such as stuffed toys or animals are more appreciated.

The electronic mail communication method according to the present invention is carried out via anthropomorphized objects such as stuffed toys or animals, so that the receivers can accept news or advertisement information without feeling any mental resistance, and therefore the method is extremely effective also as a tool for mail delivery business.

What is claimed is:

1. A communication method comprising the steps of:

obtaining an ID code of an anthropomorphized object;

providing, to a provider, the ID code assigned to the anthropomorphized object, a mail address of an owner of the anthropomorphized object, and personal attribute information of the owner; and sending, to the owner of the anthropomorphized object from the provider, an electronic mail as the anthropomorphized object based on the personal attribute information of the owner.

2. The communication method according to claim 1, wherein the electronic mail includes a conversational text including characters, signs, graphics, voices, or sounds.

3. The communication method according to claim 2, wherein at least one of news and advertisement is inserted in said conversational text.

4. The communication method according to claim 2, wherein at least one of news and advertisement is sent together with said conversational text as the electronic mail.

5. The communication method according to claim 1, wherein the electronic mail includes a message as if the anthropomorphized object wrote.

6. The communication method according to claim 1, wherein said provider includes an anthropomorphizing table having therein information of the anthropomorphized object, a user information table having therein personal information of the owner, and a standard text table having standard examples, said electronic mail being selected from the standard text table based on the anthropomorphizing table and user information table.

7. The communication method according to claim 6, wherein said electronic mail includes a conversational sentence.

* * * * *